F. L., R. P. AND L. H. MARTIN.
MAIL CATCHING AND DELIVERING DEVICE.
APPLICATION FILED AUG. 28, 1920.

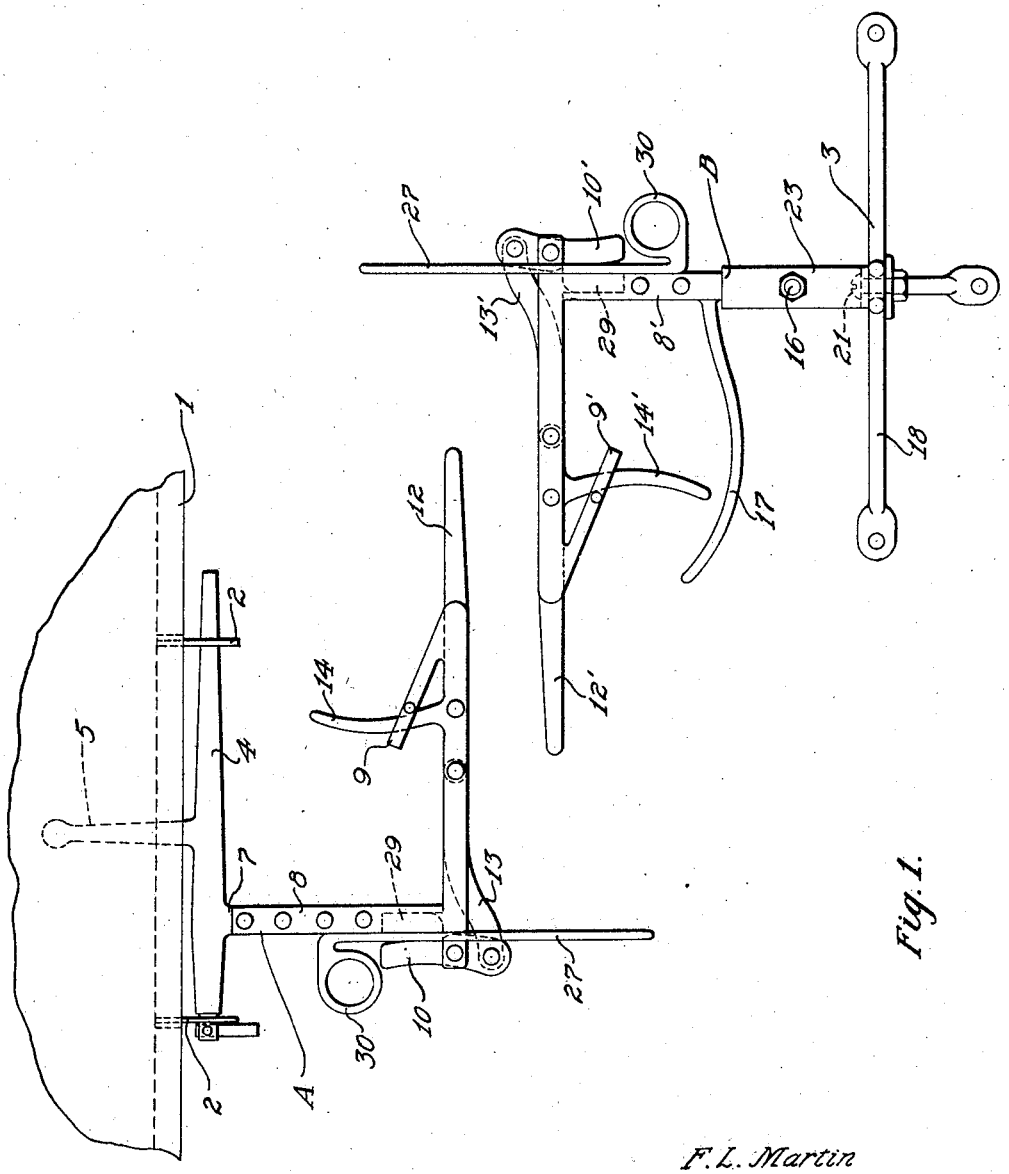

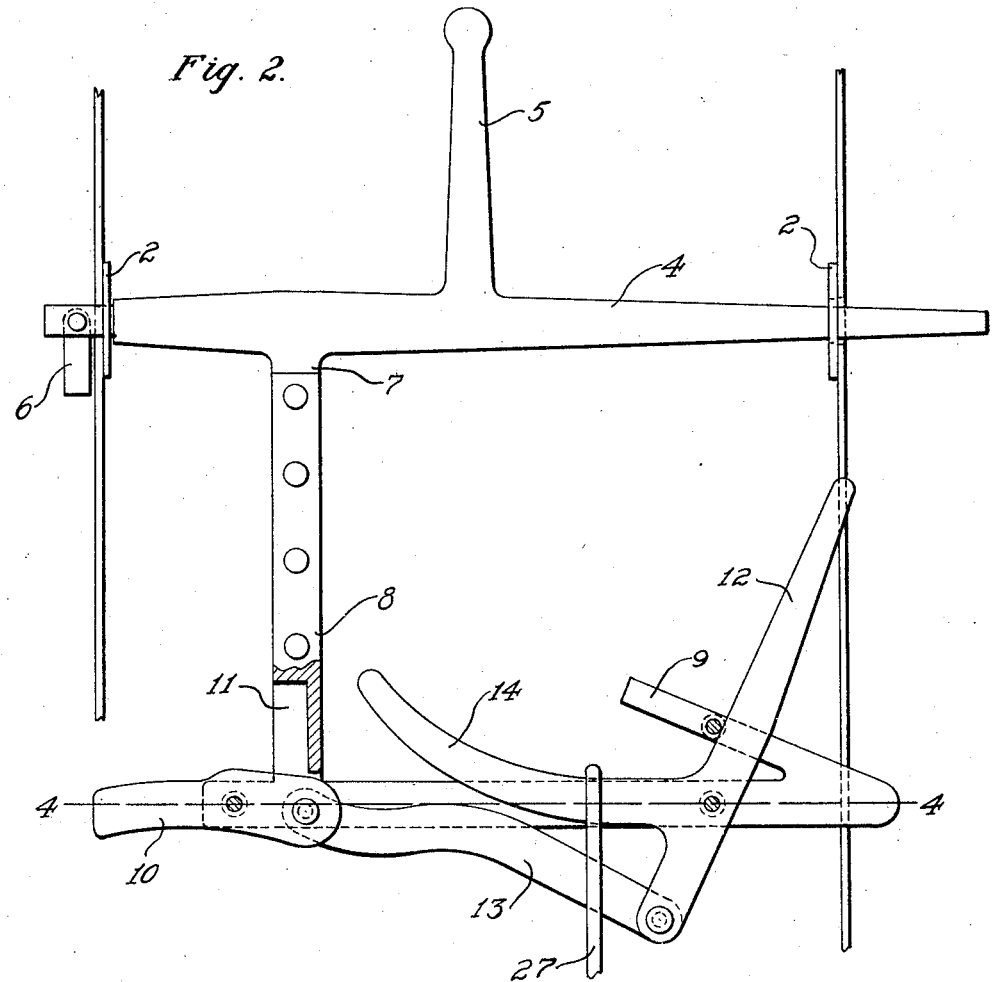
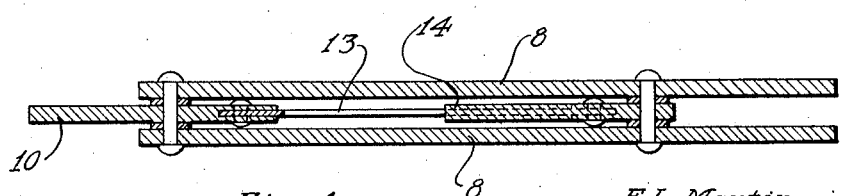

1,388,738.

Patented Aug. 23, 1921.
5 SHEETS—SHEET 3.

George L. Ljunglöf.
L. B. Middleton.
WITNESS:

F. L. Martin
R. P. Martin
L. H. Martin
INVENTOR

BY Victor J. Evans
ATTORNEY

F. L., R. P. AND L. H. MARTIN.
MAIL CATCHING AND DELIVERING DEVICE.
APPLICATION FILED AUG. 28, 1920.

1,388,738.

Patented Aug. 23, 1921.
5 SHEETS—SHEET 4.

F. L. Martin
R. P. Martin
L. H. Martin
INVENTOR

BY Victor J. Evans
ATTORNEY

F. L., R. P. AND L. H. MARTIN.
MAIL CATCHING AND DELIVERING DEVICE.
APPLICATION FILED AUG. 28, 1920.
1,388,738.
Patented Aug. 23, 1921.
5 SHEETS—SHEET 5.
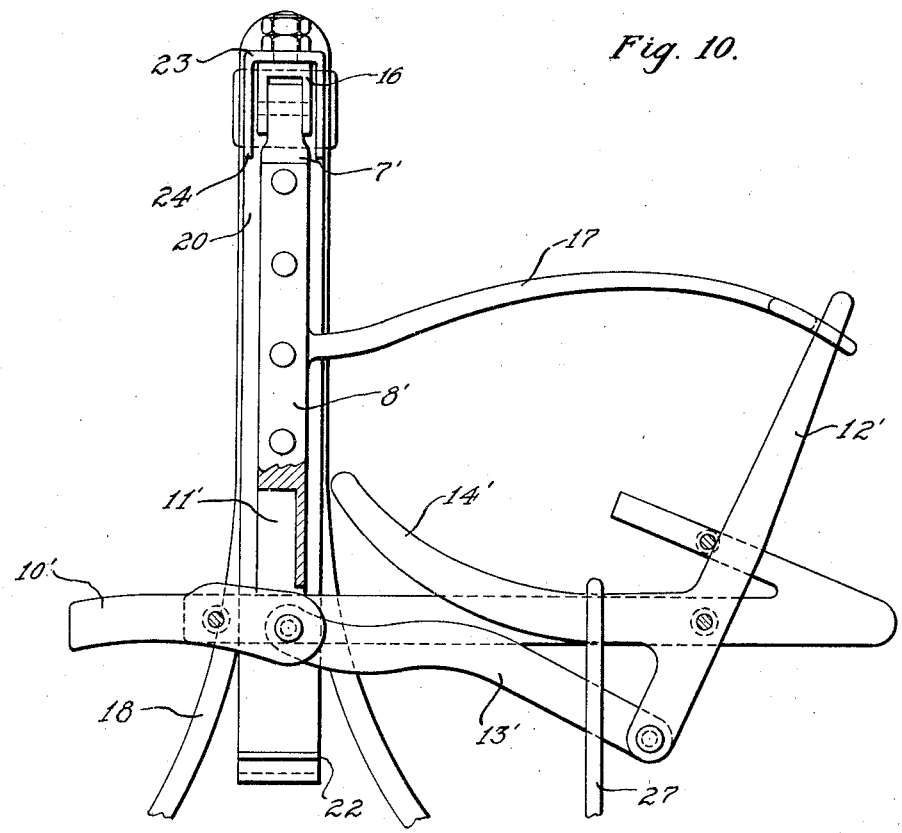
Fig. 10.
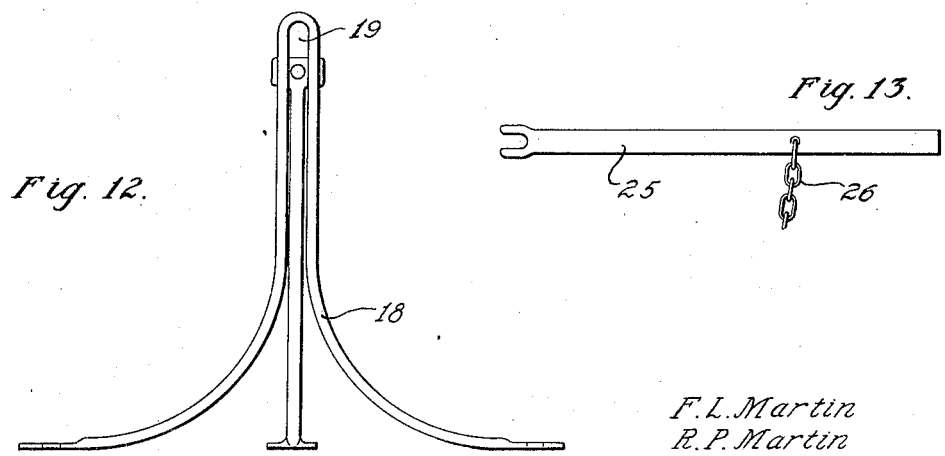
Fig. 12.
Fig. 13.
F. L. Martin
R. P. Martin
L. H. Martin.
INVENTOR
BY Victor J. Evans
ATTORNEY
WITNESS:

UNITED STATES PATENT OFFICE.

FRANK L. MARTIN, RICHARD P. MARTIN, AND LUKE H. MARTIN, OF THORNVILLE, OHIO.

MAIL CATCHING AND DELIVERING DEVICE.

1,388,738. Specification of Letters Patent. Patented Aug. 23, 1921.

Application filed August 28, 1920. Serial No. 406,597.

*To all whom it may concern:*

Be it known that we, FRANK L. MARTIN, RICHARD P. MARTIN, and LUKE H. MARTIN, citizens of the United States, residing at Thornville, in the county of Perry and State of Ohio, have invented new and useful Improvements in Mail Catching and Delivering Devices, of which the following is a specification.

This invention relates to improvements in mail catching and delivering devices, the principal object of the invention being to provide means on the train for receiving the mail bag from a device placed along the track and at the same time delivering another bag from the device on the train to the device along the track, both devices catching and holding the bags and preventing them from contacting with the ground or a part of the train.

Another object of the invention is to provide locking means for locking the bag carrying member in position on both the delivering device and the receiving device.

Another object of the invention is to provide means whereby the device placed along the track can be moved into a position so that it may receive and deliver mail to a train moving in either direction along the track and also to make the device on the train reversible and removable so that it may be placed at either side of the mail car and adjusted to suit the direction the train is traveling in.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a diagrammatic plan view showing both the device on the train and that along the track ready to receive and deliver a bag to the other device.

Fig. 2 is an enlarged front view, with parts broken away, of the device which is carried by the mail car with the parts in the position they assume after receiving the bag.

Fig. 4 is a section on line 4—4 of Fig. 2.

Fig. 10 is an enlarged front view of this device with parts of the catching and holding member broken away.

Figs. 12 and 13 are detail views.

Figure 3:
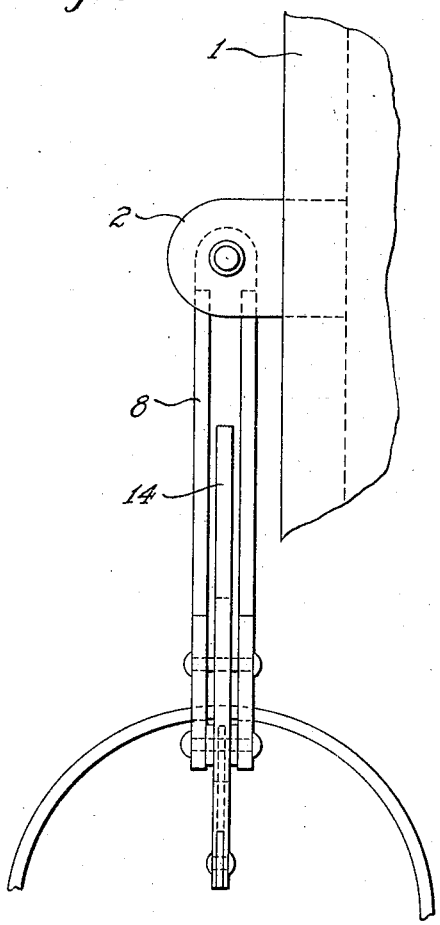
Fig. 3 is an edge view of this device.
Figure 5:
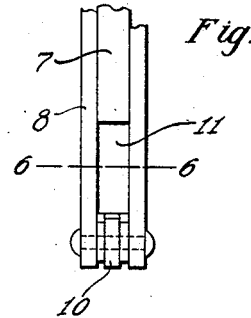
Fig. 5 is a view of the rear edge of the device showing the slot for receiving the projection on the mail bag carrying ring.
Figure 8:
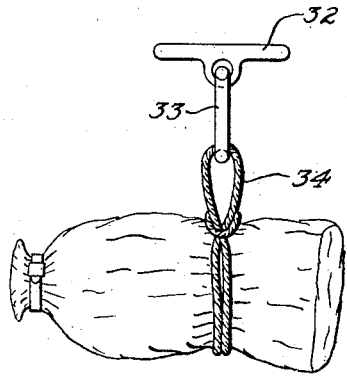
Fig. 8 is a view of the means for attaching the mail bag to the ring.
Figure 6:
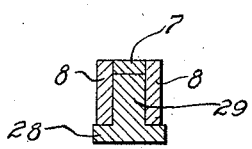
Fig. 6 is a sectional view on line 6—6 of Fig. 5, with the carrying ring projection in the slot.
Figure 7:
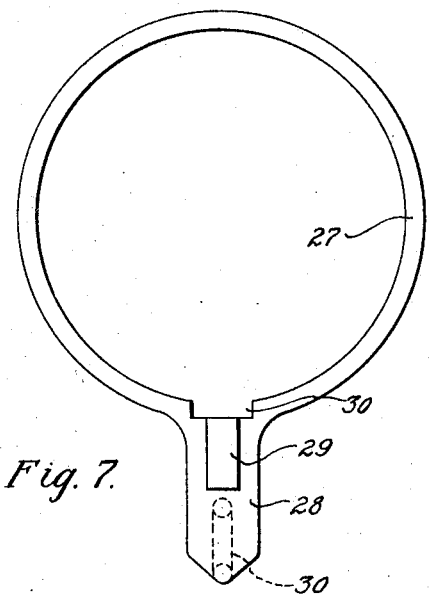
Fig. 7 is a view of one of the mail bag carrying rings.
Figure 9:
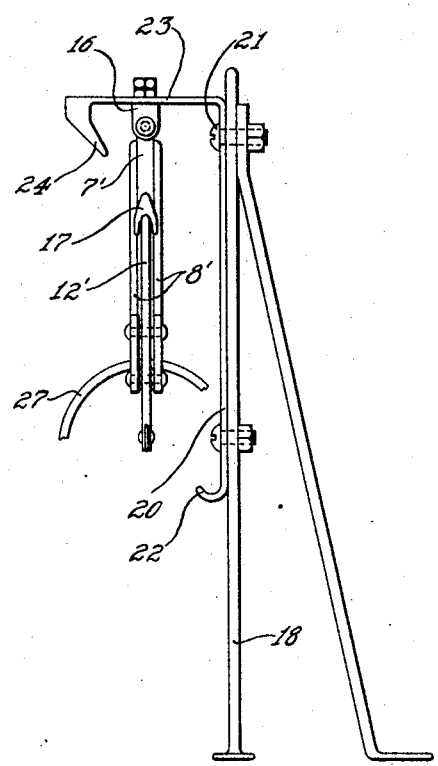
Fig. 9 is a side view of the device placed along a track.
Figure 11:
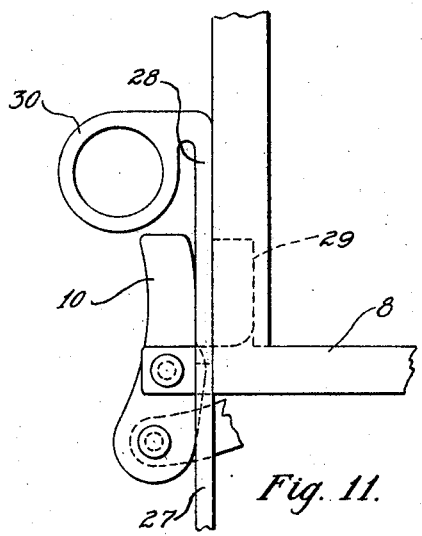
Fig. 11 is an enlarged view of a portion of the catching and holding device with the mail bag holding ring locked thereto.

In these views 1 indicates a portion of a mail car to the door frame of which the catching and delivering device A is removably attached by means of the sockets 2 and 3 indicates a supporting frame from which the device B is supported.

The device A comprises the tapered bar 4 which is provided with the handle 5, this bar and handle being formed somewhat similar to the mail bag catchers now in use. This tapered bar is removably held in the sockets 2 by the catch 6 at the enlarged end of the tapered bar. An arm 7 projects at rightangles from the tapered bar, adjacent the enlarged end thereof, and said arm carries the spaced members 8, the main portions of which extend parallel to the bar 4 and have their front ends bent back at an incline as indicated at 9. The rear ends of these members extend slightly beyond their rightangular portions which are connected with the arm 7, and pivoted between these extended portions is a short lever 10, one portion of which forms a latch for the mail bag ring. The outer end of the arm 7 is cut-away and this cut-away part with the rightangular portions of the members 8 form a recess 11 to receive a part on said ring which is held in the recess by said latch. A tapered lever 12 is pivoted between the forward ends of the spaced members 8, the pivot pin passing through said lever an appreciable distance from its large end, and this large end is connected with the lever 10 by means of the crooked link 13. These parts are so formed that when the lever 10 is swung inwardly as far as it will go it will be locked against outward movement until the lever 12 is moved a slight distance, and when the lever 12 is swung inwardly as far as it will go this lever will be locked against movement in the other direction until the lever 10 is moved slightly. The lever 12 carries a rightangularly extending finger 14 which has its free end slightly curved and a pin 15 connects the inclined parts 9 of the spaced members 8 together and acts as a stop for the inward and outward swinging movement of lever 12 and its finger 14, said lever and finger striking said pin. The finger 14 connects with the lever adjacent its pivotal point as will be seen.

The device B is made similar to the device just described with the exception of the tapered bar 4 and its handle 5 as in this device B the arm 7' is pivoted to a forked bolt 16 which is rotatably mounted in a horizontal part of the supporting frame 3. This arm also carries the forked rod 17, the forks of which receive the small end of the lever 12' when the same is swung inwardly in a position to hold the mail bag, after the same has been caught.

The supporting frame 3 comprises the uprights 18, one of which is slotted as at 19, and the member 20 which has its vertical part adjustably connected with the slotted upright by means of the bolts 21 which pass through the slot in said upright so that the said member may be adjusted vertically on the upright. The lower end of this member is formed with a hook 22 and its upper end is bent at rightangles to provide the horizontal part 23 in which the bolt 16 is supported. The extremity of this horizontal part is forked and its prongs 24 extend downwardly and adapted to receive the arms 7' between them when the device B is swung upwardly into operative position. The device B is held in this position by means of the forked bar 25 having its lower end adapted to engage the hook 22 and its upper forked end adapted to engage a part of the mail bag supporting ring when the same is in position on said device B. This rod 25 may be connected to the frame 3 by the chain 26.

The mail bag supporting ring 27 is formed with an outwardly extending flat arm 28 which carries the lug 29, this lug being adapted to engage the recess 11 in either the member A or B. The arm 28 is also provided with a recess 30 for receiving the extended ends of the spaced members 8 between which the lever 10 is pivoted. The outer end of the arm is formed with an eye 31 and this eye is adapted to receive the cross bar 32 and link 33 to which the flexible member 34 is secured but is adapted to be looped or tied around the mail bag. In this manner the mail bag is secured to the ring and it is simply necessary to pass the cross bar through the eye in order to separate the bag from the ring.

The ring member with the mail connected therewith is locked to one of the devices A or B by placing the lug 29 in the recess 11 and then swinging the lever 10 inwardly so that its latch part will bear against the outer face of the flat arm 28 of the ring and thus press said flat arm against the arm 7 and hold the lug in the recess. In this position of the locking lever the lever 12 will extend parallel to the spaced members 8 with its small end extending beyond the bent portions of said members and the finger 14 extending at rightangles between the said members and the bar 4. The device A on the mail car is moved into horizontal position by the mail clerk and the device B is swung into horizontal position and held in this position by the forked bar 25 engaging a part of the ring. In this position of the two devices the openings in the rings are in alinement with the small ends of the levers 12 of the two devices. As the train moves along the device A will engage the ring of device B while the ring carried by device A will engage the device B. As each ring strikes the finger 14 it will swing the finger and lever 12 inwardly and this movement of the lever 12 will cause the link 13 to swing the lever 10 outwardly to release the ring from the other device thus permitting the transferring of each ring to the opposite device. As the lever 12 swings inwardly the finger will partly pass between the spaced members and thus said ring will be trapped by said lever 12 and the inwardly bent ends of the spaced members. As the ring is taken from the stationary device B by the device A the forked bar 25 will drop so that the device B will swing downwardly into inoperative position.

It will thus be seen that the bags are caught and held by both devices so that there is no danger of destroying the mail matter within the bag as is the case where the bags are thrown off from the train on to the ground. The bags are locked on the devices and cannot be removed until the parts are manually moved into unlocked positions. As one bag is being delivered the other bag is being received. Both devices can be moved into position where they will be operative for a train moving in either direction.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. In combination with a mail car and a supporting frame placed along the track, a pair of members, one carried by the car and the other by said frame, each member comprising a supporting frame, a lever pivoted thereon for locking the bag to be delivered to the frame, a second lever for locking the caught bag to the frame, links connecting the two levers together so that the movement of one lever will be communicated to the other and means for moving the first lever into unlocking position and the second lever into locking position when the mail bag is engaged.

2. A mail bag catching and delivering device comprising a pair of members, one on the train and one placed along the track and each comprising a frame, a short locking lever carried thereby for locking the bag to be delivered to the frame, a long lever pivoted to the frame for locking the caught bag thereto, a finger on said long lever adapted to be struck by the carrying device of the bag and a crooked link connecting the two levers together in such a manner that the levers are locked when in their locking positions.

3. A mail bag catching and delivering device comprising a pair of members, one on the train and one along the track, and each comprising a frame, a short locking lever therein for engaging the bag to be delivered and a long lever on the frame for engaging the bag caught, a crooked link connecting said levers together, a finger extending at rightangles from the long lever, a ring member, means for connecting the bag thereto, and said ring member being adapted to strike the finger for supporting the levers.

4. A mail catching and delivering device comprising a frame having a recess therein, a mail bag carrying device having a lug thereon for engaging said recess, a locking lever pivoted in the frame and having a portion adapted to engage said device to hold the lug in the recess, a second lever pivoted in the frame, a finger thereon adapted to be struck by the said device for moving said second lever inwardly into its locking position and a link connecting said second lever with the first lever so that as the second lever is moved inwardly into locking position the first lever is moved out of locking position.

5. A mail catching and delivering device comprising a frame including an arm and spaced members extended at rightangles to the arm, said arm having a recess therein, a mail bag carrying device including a ring member, an arm connected therewith having a lug thereon for engaging said recess, a locking lever pivoted between the spaced members and adapted to engage said arm of the ring for holding said lug in the recess, a second lever pivoted between said members, a link connecting the levers together, and a finger extending at rightangles from said second lever and adapted to be struck by the ring of the bag to be caught for moving the second lever into locking position and the first lever into unlocking position.

6. A device of the class described comprising a frame including an arm and spaced members extended at rightangles from the arm, the front ends of said spaced members being bent backwardly at an incline, a short locking lever pivoted between the rear ends of said spaced members, a long lever pivoted between the front end of said spaced members, a link connecting said levers together and a finger extending at rightangles from the long lever and said finger and the long lever adapted to work between the bent ends of said members.

7. A mail bag catching and delivering device comprising a frame on the mail car including a rocking bar detachably connected with the car, a handle on said bar, an arm extending at rightangles from said bar, spaced members extending at rightangles from said arm and having rear extensions, said arm having a recess therein, a locking lever pivoted between the rear extensions, a long locking lever pivoted between the front portions of said spaced members, a link connecting said members together, a finger extending at rightangles from the long lever, said spaced members having portions bent inwardly at an incline, a stop pin carried by said portions and adapted to be engaged by the long lever and its finger for limiting the movement of the parts, and a mail bag carrier having a ring part for engaging the finger and a long lever and an arm on said ring having a lug for engaging the recess and the short lever.

8. A mail bag catching and delivering device comprising a supporting frame, a rotatable supporting member vertically arranged thereon, an arm pivoted to the lower end of said member, spaced members carried by said arm, a pair of locking levers pivoted between said spaced members, a link connecting said levers together, a forked rod carried by said arm and having its fork adapted to receive the end of one of said levers, a mail bag carrier adapted to be engaged by said lever and a forked rod having one end engaging the frame and its other end said carrier for holding the device in raised position.

In testimony whereof we affix our signatures.

FRANK L. MARTIN.
RICHARD P. MARTIN.
LUKE H. MARTIN.